US 6,574,326 B1

(12) United States Patent
Wong et al.

(10) Patent No.: US 6,574,326 B1
(45) Date of Patent: Jun. 3, 2003

(54) METHOD AND SYSTEM FOR MINIMIZING TRANSMISSION OF OPTIONAL PARAMETERS IN AN INTELLIGENT NETWORK ENVIRONMENT

(75) Inventors: Curt Wong, Plano, TX (US); Jukka Wallenius, Helsinki (FI)

(73) Assignee: Nokia Network Oy, Espoo (FI)

( * ) Notice: Subject to any disclaimer, the term of this patent is extended or adjusted under 35 U.S.C. 154(b) by 0 days.

(21) Appl. No.: 09/442,571

(22) Filed: Nov. 18, 1999

(51) Int. Cl.$^7$ ................................................ H04M 7/00
(52) U.S. Cl. ............................ 379/221.08; 379/221.07; 379/211.02; 455/433; 455/461; 455/560
(58) Field of Search ................................ 455/433, 461, 455/414, 445, 560; 379/221.08, 221.07, 211.02

(56) References Cited

U.S. PATENT DOCUMENTS

| | | | | |
|---|---|---|---|---|
| 5,428,665 A | * | 6/1995 | Lantto | 379/58 |
| 5,839,076 A | | 11/1998 | Becher | |
| 5,898,917 A | | 4/1999 | Batni et al. | 455/564 |
| 5,905,958 A | | 5/1999 | Houde | 455/437 |
| 6,044,264 A | * | 3/2000 | Huotari | 455/414 |
| 6,201,862 B1 | * | 3/2001 | Mercouroff | 379/230 |
| 6,226,516 B1 | * | 4/2001 | Gupta | 455/433 |
| 6,230,025 B1 | * | 4/2001 | Chin | 455/560 |
| 6,243,455 B1 | * | 6/2001 | Tuunanen | 379/219 |
| 6,295,345 B1 | * | 9/2001 | Pullen | 379/114.28 |
| 6,298,234 B1 | * | 10/2001 | Brunner | 455/432 |
| 6,301,350 B1 | * | 10/2001 | Henningson | 379/220.01 |
| 6,314,172 B1 | * | 11/2001 | Nightingale | 379/201 |
| 6,317,594 B1 | * | 11/2001 | Gossman et al. | 455/414 |
| 6,327,355 B1 | * | 12/2001 | Britt | 379/201.03 |
| 6,332,022 B1 | * | 12/2001 | Martinez | 379/220.01 |
| 6,341,162 B1 | * | 1/2002 | Kelly | 379/221.09 |
| 6,341,221 B1 | * | 1/2002 | Huotari | 455/414 |

FOREIGN PATENT DOCUMENTS

| | | |
|---|---|---|
| EP | 0 830 039 A1 | 3/1998 |
| GB | 2 307 374 A | 11/1995 |
| WO | WO 98/53626 | 5/1998 |

OTHER PUBLICATIONS

"Alcatel: Wireless Intelligent Network (WIN) Tutorial," http://www.webproforum.com/alcate12/full.html, Feb. 12, 1999.

* cited by examiner

Primary Examiner—William Trost
Assistant Examiner—Marcos Torres
(74) Attorney, Agent, or Firm—Cohen, Pontani, Lieberman & Pavane

(57) ABSTRACT

A method and a system for reducing transmission of parameters between a-mobile switching center and a service control point in a telecommunication network such as the Wireless Intelligent Network. The mobile switching center transmits a first signaling message containing only a first set of parameters to the service control point during initial call processing. In response, the service control point transmits a second signaling message to the mobile switching center indicating to the service switching point a second set of parameters required by the service control point with respect to the first signaling message. The service switching point then transmits the second set of parameters in a third signaling message to the service control point in response to the second signaling message. During subsequent call processing, the mobile switching center transmits to the service control point the first signaling message containing both the first set of parameters and the second set of parameters without requiring the service control point to again indicate to the mobile switching center the second set of parameters required by the service control point with respect to the first signaling message.

21 Claims, 2 Drawing Sheets

Subsequent Call Processing

Initial Call Processing

Subsequent Call Processing

METHOD AND SYSTEM FOR MINIMIZING TRANSMISSION OF OPTIONAL PARAMETERS IN AN INTELLIGENT NETWORK ENVIRONMENT

BACKGROUND OF THE INVENTION

1. Field of the Invention

The present invention relates to telecommunication networks and, more particularly, to a method and system for minimizing parameters passed between two network elements in a telecommunication network such as, for example, the wireless intelligent network (WIN).

2. Description of the Related Art

Advanced wireless network such as the Wireless Intelligent Network (WIN) offers enhanced subscriber services such as, for example, seamless terminal services, personal mobility services and advance network services in the mobile environment. Examples of such services include 800 services, Credit Card Verification, Geographic Call Routing, Flexible Call Routing, Flexible Carrier Selection, CLASS Services, and Single Number Service. These services typically involve executing service logic programs on a platform external to a switching equipment or a Service Switching Point (SSP) (e.g., a Mobile Switching Center (MSC) or a Local Switch (LS)) by, for example, accessing a database that resides in another network element. These service logic programs communicate with the switching equipment using a common set of protocols such as the SS7 (Signaling System 7) signaling protocol.

Current WIN protocols, as specified by WINTIA/EIA-41 or its equivalents (which are incorporated herein by reference), require a Service Control Point (SCP) for storing information relating to enhanced subscriber services available to a subscriber and which can be accessed by other switching equipment including a MSC. The SCP, through the execution of the Service Control Function (SCF), receives service query messages from the SSP and transmits thereto response messages to thereby enable the SSP to continue call processing. The SCP also requests and receives from the SSP messages containing the requisite parameters to invoke enhanced services.

A problem with the current protocol is that during a single call cycle, a predefined set of parameters may be repeatedly carried in different signal messages transmitted between the SSP and the SCP. Such repeated and needless transmission of the same parameters wastes valuable transport network resources.

SUMMARY OF THE INVENTION

An object of the present invention is to minimize the number of parameters transmitted between two network elements of a telecommunication network such as, for example, a Wireless Intelligent Network.

According to an aspect of the invention, a Service Control Point (SCP) indicates to a Service Switching Point (SSP) which call-related information is needed so that only the requisite parameters are sent to the SCP.

According to another aspect of the invention, the SCP indicates to the SSP which call-related information is not needed such that all other information is sent to the SCP.

According to still another aspect of the invention, the SCP requests the SSP to report only the call-related information that has been changed since its last transmission.

In one embodiment, the invention provides a method and a system for transmitting a first signaling message from the first network element to the second network element during initial call processing initiated by a subscriber, the first signaling message containing a first set of parameters required by the second network element. A second signaling message is transmitted from the second network element to the first network element indicating to the first network element a second set of parameters required by the second network element in response to the first signaling message. The second set of parameters is transmitted in a third signaling message from the first network element to the second network element in response to the second signaling message. During subsequent call processing initiated by the subscriber, the first signaling message containing both the first set of parameters and the second set of parameters is transmitted from the first network element to the second network element without requiring the second network element to again indicate to the first network element the second set of parameters required by the second network element in response to the first signaling message.

In another embodiment of the invention, all of the parameters required by a service and the triggering data to trigger the service are managed by a service management function that may be located at one or more nodes. The service management function may update information on the required parameters and triggering data in, for example, the home location register. Thus, the triggering data and the parameters may be transmitted from the home location register to a Service Switching Point during, for example, location updating by a mobile station. When a triggering event is encountered at the Service Switching Point, the Service Switching Point transmits to a service control entity, e.g., the Service Control Point the required parameters for enabling a subscription service corresponding to the triggering event. The Service Control Point then sends signaling messages back to the Service Switching Point to execute the service for the subscriber.

The set of parameters required can be determined based on the different service provided for the subscriber at the Service Control Point at different trigger detection points.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

It is noted that, throughout this specification, Wireless Intelligent Network (WIN) or Intelligent Network (IN)

designates any solution in which a call, connection or session processing node contacts a Service Control Function (SCF) which issues instructions to the respective node. Contact to the Service Control Function is based on trigger information stored in the respective nodes or downloaded thereto from an external node such as, for example, a Home Location Register (HLR). The trigger information may include specific events or situations occurring during the course of a call, connection or session handling. The Service Control Function may be internally distributed. Moreover, the corresponding IN protocol could be any protocol between a controlling entity, such as a Service Control Function (e.g. SCP or Camel CSE), responsive to triggering from a call, and a session or connection processing node. The IN protocol may, for example, be an object oriented interface where the operations are object methods or invocations. Similarly, the protocol may be an ASCH text message based protocol similar to the HyperText Transfer Protocol (HTTP).

Figure 1:
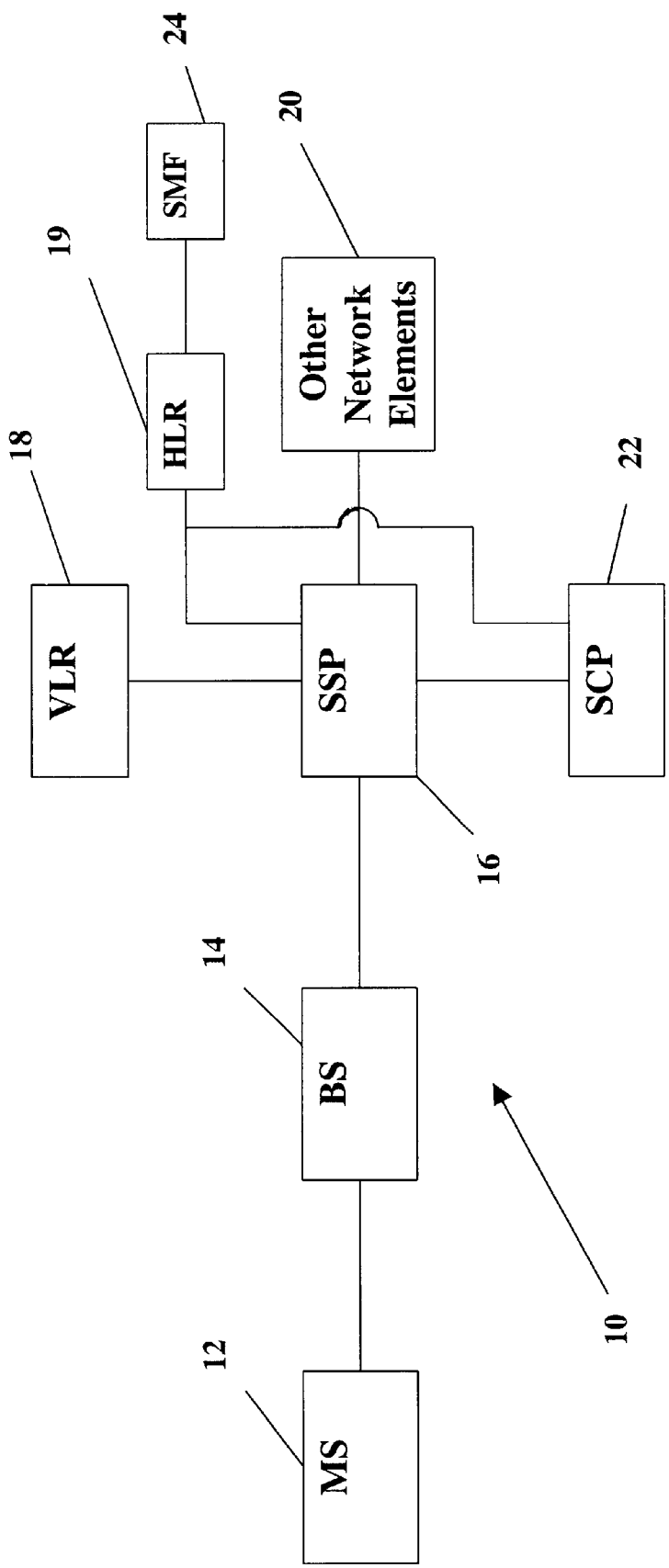
FIG. 1 schematically illustrates elements of a telecommunication network configured in accordance with one embodiment of the invention.

FIG. 1 diagrammatically illustrates elements of a telecommunication network such as the Wireless Intelligent Network (WIN) 10 or other Intelligent Network (IN). The network 10 includes a mobile station (MS) 12 (e.g., a cellular phone) for transmitting and receiving voice and data calls, a base station (BS) 14 for relaying calls between the MS 12 and a network element such as, for example, or a Service Switching Point (SSP) 16 (e.g., a Mobile Switching Center (MSC)). The SSP 16 monitors and routes calls between the BS 14 and other network elements 20. A visitor location register (VLR) 18 and a home location register (HLR) 19, accessible by the SSP 16, stores the current location of the MS 12 and subscriber data. A Service Node (SN) or a Service Control Point (SCP) 22 connected to the SSP 16 serves as a repository of information and a controller for determining the type of services available to a subscriber. The SSP 16, preferably a telephone switching equipment, is configured to execute a plurality of service logic programs including the Service Switching Function (SSF) for communicating with the SCP 22. The SCP 22, preferably a general-purpose processor, is configured to execute a plurality of service logic programs including the Service Control Function, for communicating with the SSP 16. The SSP 16 and SCP 22 communicate with each other through conventional input/output interface using a set of WIN operations (i.e., signaling messages) defined in the WINTIA/EIA-41 standard or its equivalents. These WIN operations, however, are burdensome to the transport portion of the network as they require the transmission of all of the parameters, both "mandatory" and "optional," permitted by each operation, regardless of whether the SCF requires the optional parameters for a particular subscriber. "Mandatory" parameters are those parameters necessary for establishing or processing a call and which are transferred between the SSP 16 and the SCP 22 in a signaling message or WIN operation. "Optional" parameters, on the other hand, are used for invoking optional enhanced services which are available to a subscriber typically for an extra service fee. Typical WIN operations or messages between the SSP 16 and SCP 22 include a great number of "optional" parameters, due to the flexibility of services available to subscribers.

Advantageously, instead of requiring the SSP 16 to transmit to the SCP 22 all mandatory and optional parameters permitted by each WIN operation, the SCP 22 is programmed to request or indicate to SSF (a service logic program of SSP 16) only those "optional" parameters required to invoke enhanced services for a particular subscriber in response to a signaling message from the SSF. In other words, the transmission of "optional" parameters will be customized to each subscriber such that only those optional parameters relating to those services available to the particular subscriber will be transmitted by SSF. Since it is unlikely that every subscriber has subscribed to all of the services provided by the network, the present invention will enable the network to more efficiently utilize valuable network resources.

The request may be encoded in the form of a new WIN operation (or signaling message) such as, for example, CallDataRequest, and defined to indicate to the SSF the optional parameters required by SCF (a service logic program of SSP 16) for processing a corresponding query from the SSF. Thus, the SSF need only to transmit the mandatory parameters in an initial query and then the optional parameters requested by SCF in a subsequent message such as, for example, an acknowledgement message to the new WIN operation from SCF. Preferably, SSF stores the optional parameters or otherwise recalls the optional parameters corresponding to each WIN operation required by SCF so that in subsequent call processing (which may or may not result in a completed call connection), the SSF transmits the mandatory parameters and only the requested optional parameters for each WIN operation transmitted or executed in subsequent call processing. In this manner, the data transmitted through the transport network is minimized since SSF transmits the minimum set of optional parameters during initial call processing and in subsequent call processing.

In another embodiment of the invention, a Service Management Function (SMF) 24 is used to designate the optional parameters required for enabling an intelligent network service for a particular subscriber. SMF 24 may reside in the SCP 22 or another intelligent network node. Its function is to manage the trigger data in, for example, the HLR 19 or SSP 16, to provide intelligent network services for subscribers. The SMF 24 may specify the optional parameters required by an intelligent network service as part of or in addition to the trigger data. The required optional parameters may also be specified by listing parameter groups (i.e., each parameter group is a set of optional parameters grouped in a predetermined fashion as required by different type of services). The required optional parameters are indicated to the SSP 16 when the SSP 16 first receives the trigger data from the external node (e.g., when MSC/SSP receives WIN triggering data or Customized Applications for Mobile Network Enhanced Logic (CAMEL) subscription data from the HLR during registration or location update procedure). Alternately, while the SCF examines the optional parameters received from an operation sent from the SSP 16, the SCF may inform the SMF 24 about which optional parameters are missing or not needed and the SMF 24 may then update the optional parameter requirement in the subscriber trigger data stored at, for example, the HLR 19 or SSP 16. The indication of the required optional parameters may be carried in the same operation that is used to manage the trigger data from the external node to the SSP (e.g. during location updating) or via a separate operation.

In another embodiment of the invention the interface between the SSF and SCF may be based on distributed object oriented technologies (e.g. common object request broker architecture (CORBA)). In this embodiment, the optional parameters required by the SCF may be indicated as an interface class to be used by the SSF. For example, the interface class to be used can be specified as a class hierarchy wherein the optional parameter groups are indicated as abstract classes to be inherited by a base interface class. The base interface class represents the mandatory parameters. Therefore, the interface class can be specified as a list of abstract classes and a base interface class. Furthermore, the versions and/or identities for the abstract classes and the base interface class may also be specified in the trigger data stored for example at the HLR 19.

When the user or subscriber initiates a call and the triggering event or detection point specified by the triggering data is encountered at the SSP 16, the optional parameters together with the mandatory parameters specified by the triggering data are sent in a signaling message to the SCP 22. The SCP 22 (or SMF) may manage the triggering data and the optional parameters (required for a triggering event) at the HLR 19 or at an equivalent external node as a response to a previous SSP inquiry that does not contain all the needed optional parameters. In response to the message from the SSP 16, the SCP 22 transmits to the SSP 16 a signaling message (e.g., an acknowledgement message) containing the parameters required to enable the subscription service corresponding to the triggering event.

The parameters required for each triggering event can be determined by the SMF or SCP 22 based on the set of services subscribed by the subscriber. Associated with each of these services is the set of parameters required by the service at triggering. The SMF 24 or SCP 22 determines the overall set of parameters required by going through the services, their triggering events and parameters required by the triggering events. The triggering data at the HLR 19 including the parameters required may be updated when the subscription of a new service is added to the subscriber.

Figure 2:
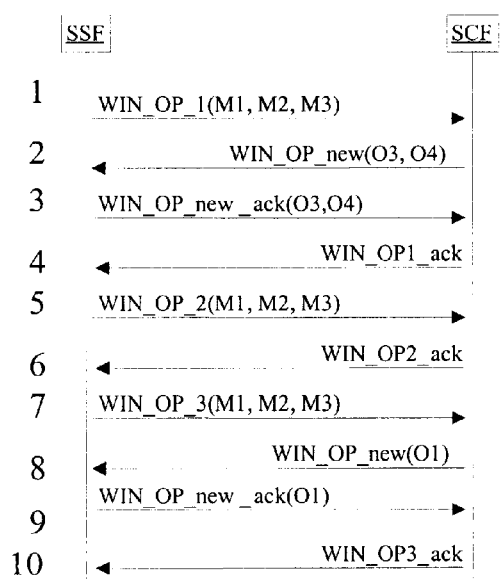
FIG. 2 is a call flow diagram illustrating a sequence of messages between the Service Switching Function (SSF) and the Service Control Function (SCF) during initial call processing in accordance with an embodiment of the invention.

FIG. 2 is a call flow diagram depicting a message sequence during initial call processing (e.g., call setup, call disconnect, call forwarding, and voice announcement) initiated by a subscriber originating a first call in the network according to an embodiment of the present invention. Initially, the SSF transmits to the SCF a WIN operation (WIN$_{13}$ OP$_{13}$ 1(M1, M2, M3)) containing "mandatory" parameters M1, M2, and M3. This WIN operation is sent when triggering criteria for an initial SCP inquiry are met at the SSP 16. The WIN operation may be OriginationRequest (ORREQ) for verifying that the subscriber is permitted to call. These "mandatory" parameters include, for example, MSCID (i.e., the serving MSC identification), BILLID (i.e., the billing identification of the subscriber), MSID (i.e., mobile station identification), and DGTSDIAL (i.e., the digits entered by the mobile station). They are mandatory in the sense that these parameters are required to process a call. Although three mandatory parameters are shown, the number of mandatory parameters may be more less than three.

Service logic SCF may then initiate the new WIN operation (e.g. CallDataRequest (O3, O4)) requesting the SSF to transmit optional parameters (e.g. a conference call indicator or a preferred language indicator) required by the SCF to determine, for example, whether a subscriber should be granted access to a service. The optional parameters may, for example, be preferred language indicator, and mobile directory number. In response, the SSF transmits to SCF the requested optional parameters in an acknowledgement message (e.g. CallDataRequest_ack (O3, O4)) containing the requested optional parameters. The number of optional parameters may alternatively be more or less than two. The SCF then sends an acknowledgement (e.g. WIN_OP_1_ack) to SSF to acknowledge receipt of the signaling message WIN_OP_1(M1, M2, M3).

The SSF may initiate another WIN operation (e.g., WIN_OP_2 (M1, M2, M3)) containing mandatory parameters M1, M2, and M3. This WIN operation may be AnalyzeInformation (ANLYZD) used by the MSC to provide notification to a service logic network element (e.g., SCP, SN) that a trigger criterion has been satisfied. The SCF acknowledges this operation by returning an acknowledgement message (e.g., WIN_OP_2_ack). In this case, the SCF does not need any optional parameters. The SSF may initiate still another WIN operation (e.g., WIN_OP_3 (M1, M2, M3)) transmitting only mandatory parameters (e.g., M1, M2, and M3). In response, the SCF sends another request for an optional parameter such as, for example, O1 (e.g., LocationAreaID) using the new WIN operation WIN_OP_new (O1). The SSF returns the requested optional parameter O1 using the acknowledgement message WIN_OP_new_ack (O1). SCF acknowledges receipt of the optional parameter O1 by responding with an acknowledgement message, WIN_OP3_ack.

Figure 3:
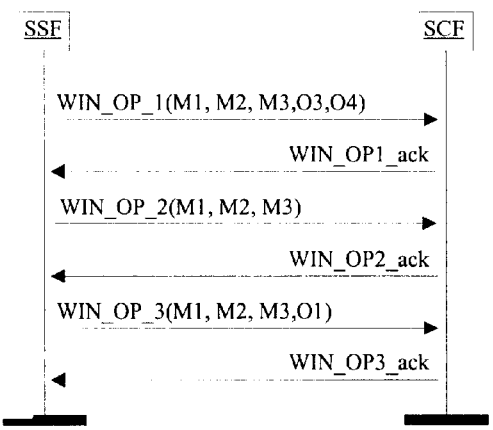
FIG. 3 is a call flow diagram illustrating a sequence of messages between the SSF and the SCF during subsequent call processing according to the embodiment of FIG. 2.

As shown in FIG. 3, during subsequent call processing of the same call handled during the initial call processing or another call subsequent to that handled during the initial call processing (e.g., when the subscriber originates another call in the network subsequent to the call processing of FIG. 2), the SSF initiates again an initial WIN operation: WIN_OP_1(M1, M2, M3, O3, O4) which may be the same as or equivalent to WIN_OP_1 of the initial call processing. As shown in FIG. 3, during call processing of a subsequent call (e.g. when the subscriber originates another call in the network subsequent to the call in the network subsequent to the call processing of FIG. 2), the SSF initiates again an initial WIN operation: WIN_OP_1 (M1, M2, M3, O3, O4). Unlike the initial call processing, WIN_OP_1 now carries not only mandatory parameters M1, M2, and M3, but also optional parameters O3 and O4 that were requested during the initial call processing, since the SSF has already learned the optional parameters required by the SCF for processing the present call. The SSF may then initiate another WIN operation (e.g., WIN_OP_2(M1, M2, M3)) and the SCF acknowledges by returning WIN_OP2_ack message to the SSF. Next, the SSF may transmit WIN_OP_3 (M1, M2, M3, O1) to SCF with the mandatory parameters M1, M2, and M3, and the previously requested optional parameter O1. It is noted that the SCF need not send any further requests for optional parameters during this subsequent call processing, at least with respect to those WIN operations already employed during the initial call processing, thereby minimizing data flow between the SSP 16 and the SCP 22. The subscriber data in the VLR 18 or HLR 19 may have to be updated so that the information on the optional parameters would be available for subsequent calls.

In yet another embodiment of the invention, the optional parameters needed for subsequent WIN event report messages within the call processing of the same call can be learned by the SSF. When SSF sends an initial WIN operation WIN_OP_1 to the SCF, the SCF can request the reporting of the encounter of one or more triggering events possibly occurring during subsequent call processing of the same call. The request message for the triggering-event encounter reports may specify the optional parameters and parameter groups needed in these reports.

The subsequent call processing of the same call includes all the basic call state model phases (referred to as points in call in the standards) and the detection points after the detection point at which the initial WIN operation was sent.

It is contemplated that the SCF request may be incorporated in an existing or an already-defined WIN operation, rather than in a new WIN operation as described above. In addition, the new WIN operation may be encoded to indicate to the SSF which optional parameters are not required by SCF so that SSF may send all other optional parameters. The SCF requests the SSF to report or transmit only those optional parameters whose contents (i.e., values) have changed since they were last sent to the SCF. In this case, the SCF need only update the changed optional parameters, thereby further reducing the data transmitted from the SSF.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for reducing transmission of parameters between a first network element and a second network element in a telecommunication network, comprising in sequence the steps of:
   (a) transmitting a first signaling message from the first network element to the second network element during initial call processing initiated by a subscriber, the first signaling message containing a first set of parameters required by the second network element;
   (b) transmitting a second signaling message from the second network element to the first network element indicating to the first network element a second set of parameters required by the second network element in response to the first signaling message, wherein the second set of parameters is selected by indicating to the first network any element parameters not required by the second network element so that the second set of parameters includes all other parameters;
   (c) transmitting the second set of parameters in a third signaling message from the first network element to the second network element in response to the second signaling message; and
   (d) during subsequent call processing, transmitting a fourth signaling message containing both the first set of parameter's and the second set of parameters from the first network element to the second network element without requiring the second network element to again indicate to the first network element the second set of parameters required by the second network element in response to the first signaling message.

2. The method of claim 1, wherein in step (d) the fourth signaling message is the same as the first signaling message.

3. The method of claim 1, during the subsequent call processing, further comprising the step of reporting to the second network element only those parameters whose values have changed since they were last sent to the second network element.

4. The method of claim 1, wherein the first network element routes calls between a mobile station and other network elements.

5. The method of claim 1, wherein the second network element controls the subscriber's access to services provided by the telecommunication network.

6. The method of claim 1, wherein the telecommunication network is a Wireless Intelligent Network.

7. The method of claim 1, wherein the first set of parameters comprises mandatory parameters of a signaling message employed in a Wireless Intelligent Network environment.

8. The method of claim 1, wherein the second set of parameters comprises optional parameters of a signaling message employed in a Wireless Intelligent Network environment.

9. The method of claim 1, wherein the first signaling message is an OriginiationiRequest operation defined for a Wireless Intelligent Network.

10. The method of claim 1, wherein the initial call processing includes call setup, call disconnect, call forwarding and voice announcement.

11. The method of claim 1, wherein the subsequent call processing includes call setup, call disconnect, call forwarding and voice announcement.

12. A method for reducing transmission of parameters between a first network element and a second network element in a telecommunication network, comprising in sequence the steps of:
   (a) transmitting a first signaling message from the first network element to the second network element during initial call processing initiated by a subscriber, the first signaling message containing a first set of parameters required by the second network element;
   (b) transmitting a second signaling message from the second network element to the first network element indicating to the first network element a second set of parameters required by the second network element in response to the first signaling message;
   (c) transmitting the second set of parameters in a third signaling message from the first network element to the second network element in response to the second signaling message; and
   (d) during subsequent call processing, transmitting a fourth signaling message containing both the first set of parameters and the second set of parameters from the first network element to the second network element without requiring the second network element to again indicate to the first network element the second set of parameters required by the second network element in response to the first signaling message, wherein the first network element is a Service Control Point and the second network element is a Service Switching Point, and the fourth signaling message is sent when a triggering event, a report of which the Service Control Point requested after receiving the first signaling message, is encountered at the Service Switching Point.

13. The method of claim 12, wherein the first signaling message is sent when triggering criteria for an initial inquiry by the Service Control Point are met at the Service Switching Point.

14. The method of claim 1, wherein in step (d), the subsequent call processing is for a call subsequent to that handled during the initial call processing.

15. The method of claim 1, wherein in step (d), the initial and the subsequent call processings are for the same call.

16. A system for reducing data flow in a telecommunication network, comprising:
   (a) a first network element for routing calls between the telecommunication network and a mobile station;

(b) a second network element, connected to said first network element, for controlling access to the telecommunication network by a subscriber;

(c) means for transmitting a first signaling message from said first network element to said second network element during initial call processing initiated by a subscriber, the first signaling message containing, a first set of parameters required by said second network element;

(d) means for transmitting a second signaling message from said second network element to said first network element indicating to said first network element a second set of parameters required by said second network clement in response to the first signaling message, wherein the second set of parameters is selected by indicating to the first network any element parameters not required by the second network element so that the second set of parameters includes all other parameters;

(e) means for transmitting the second set of parameters in a third signaling message from said first network element to said second network element in response to the second signaling message; and (f) means for transmitting, during subsequent call processing initiated by the subscriber, a fourth signaling message containing both the first set of parameters and the second set of parameters from said first network element to said second network element without requiring said second network element to again indicate to said first network element the second set of parameters required by said second network element in response to the first signaling message.

17. The system of claim 16, wherein said first network element is a mobile switching center for routing calls between a mobile station and other network elements.

18. The system of claim 16, wherein the second network element is a general purpose computer programmed to control access to the network by subscribers.

19. The system of claim 16, wherein said first network element is a service switching point.

20. The system of claim 17, wherein said second network element is a service control point.

21. The system of claim 17, wherein said first network element is a mobile switching center.

* * * * *